(12) United States Patent
Hida et al.

(10) Patent No.: US 10,883,503 B2
(45) Date of Patent: Jan. 5, 2021

(54) GAS EJECTION APPARATUS

(71) Applicant: DENSO TEN Limited, Kobe (JP)

(72) Inventors: Masashi Hida, Kobe (JP); Tomohisa Koseki, Kobe (JP); Masashi Otomi, Kobe (JP); Toru Yamaguchi, Kobe (JP)

(73) Assignee: DENSO TEN Limited, Kobe (JP)

( * ) Notice: Subject to any disclaimer, the term of this patent is extended or adjusted under 35 U.S.C. 154(b) by 203 days.

(21) Appl. No.: 16/161,383

(22) Filed: Oct. 16, 2018

(65) Prior Publication Data

US 2019/0145407 A1  May 16, 2019

(30) Foreign Application Priority Data

Nov. 14, 2017 (JP) ................. 2017-219478

(51) Int. Cl.
*F04C 21/00* (2006.01)
*F04C 9/00* (2006.01)
(Continued)

(52) U.S. Cl.
CPC ............ *F04C 21/002* (2013.01); *F04C 9/002* (2013.01); *F04C 15/0061* (2013.01); *F04C 29/005* (2013.01); *F04C 29/047* (2013.01); *F16H 27/08* (2013.01); *F16H 57/12* (2013.01); *B60S 1/56* (2013.01); *F04C 23/008* (2013.01); *F04C 2210/1005* (2013.01); *F04C 2220/28* (2013.01); *F04C 2240/30* (2013.01); *F04C 2240/80* (2013.01); *F04C 2240/803* (2013.01); *F04C 2240/808* (2013.01); *F05B 2260/4031* (2013.01); *F05B 2260/502* (2013.01); *F16H 2057/127* (2013.01)

(58) Field of Classification Search
CPC .............. F04C 2240/808; F04C 23/008; F04C 18/0215; F04C 2240/30; F04C 2240/803; F04C 29/047; F04C 29/045; F04C 2240/403; F04C 21/002; F04C 9/002; F04C 11/008; F04C 18/0207; F04C 21/00
USPC .......................................... 417/410.3–410.5
See application file for complete search history.

(56) References Cited

U.S. PATENT DOCUMENTS 7,009,318 B2 * 3/2006 Iritani .................... F04B 35/04
  310/52
8,360,752 B2 * 1/2013 Watanabe ............... F01C 21/10
  417/410.1

(Continued)

FOREIGN PATENT DOCUMENTS

JP  2014-037239 A  2/2014

*Primary Examiner* — Peter J Bertheaud
(74) *Attorney, Agent, or Firm* — Oliff PLC (57) ABSTRACT

A gas ejection apparatus includes: a cylinder having a rotating member that rotates within the cylinder; a motor coupled to the rotating member of the cylinder and that causes gas to be compressed inside the cylinder and to be ejected from the cylinder by causing rotation of the rotating member; a control circuit board that controls the motor; and a case in which the cylinder, the motor and the control circuit board are disposed. The case extends in a planar direction and has side surfaces that are orthogonal to the planar direction. The motor and the cylinder are arranged adjacent to each other in the planar direction of the case. The control circuit board is disposed adjacent to and substantially parallel to one of the side surfaces of the case.

12 Claims, 7 Drawing Sheets

(51) Int. Cl.
*F04C 15/00* (2006.01)
*F04C 29/00* (2006.01)
*F04C 29/04* (2006.01)
*F16H 27/08* (2006.01)
*F16H 57/12* (2006.01)
*B60S 1/56* (2006.01)
*F04C 23/00* (2006.01)

(56) References Cited

U.S. PATENT DOCUMENTS

| | | | |
|---|---|---|---|
| 8,777,591 B2* | 7/2014 | Cho | F01C 17/066 |
| | | | 417/366 |
| 9,810,219 B2* | 11/2017 | Suitou | F04C 29/047 |
| 2009/0269220 A1* | 10/2009 | Nakagawa | F04C 18/3446 |
| | | | 417/366 |
| 2018/0142688 A1* | 5/2018 | Otomi | F16H 33/02 |
| 2018/0154869 A1* | 6/2018 | Yamanaka | G02B 27/0006 |

* cited by examiner

FIG. 5B ns of the
GAS EJECTION APPARATUS

BACKGROUND OF THE INVENTION

Field of the Invention

The invention relates to a gas ejection apparatus and a gas ejection system.

Description of the Background Art

Conventionally, there has been a gas ejection apparatus that compresses intake gas and then ejects the compressed gas. One example of those gas ejection apparatuses is an apparatus that is installed on a vehicle to remove rain drops, snowflakes, dirt, dust, mud, and other objects on a lens of an on-vehicle camera by ejecting compressed gas toward the lens.

However, the conventional gas ejection apparatus can be improved in size thereof.

SUMMARY OF THE INVENTION

According to one aspect of the invention, a gas ejection apparatus includes: a cylinder having a rotating member that rotates within the cylinder; a motor coupled to the rotating member of the cylinder and that causes gas to be compressed inside the cylinder and to be ejected from the cylinder by causing rotation of the rotating member; a control circuit board that controls the motor; and a case in which the cylinder, the motor and the control circuit board are disposed. The case extends in a planar direction and has side surfaces that are orthogonal to the planar direction. The motor and the cylinder are arranged adjacent to each other in the planar direction of the case. The control circuit board is disposed adjacent to and substantially parallel to one of the side surfaces of the case.

Thus, the gas ejection apparatus can be downsized.

According to another aspect of the invention, the gas ejection apparatus further includes a gas inlet that is provided in one of the side surfaces of the case adjacent to the motor. The gas inlet takes in the gas from an outside of the case to an inside of the case.

Thus, it is possible to cool the motor by the gas taken in from the outside of the case to the inside thereof.

Therefore, an object of the invention is to provide a gas ejection apparatus and a gas ejection system that are downsized further.

These and other objects, features, aspects and advantages of the invention will become more apparent from the following detailed description of the invention when taken in conjunction with the accompanying drawings.

DESCRIPTION OF THE EMBODIMENTS

A gas ejection apparatus and a gas ejection system of this embodiment will be described in detail below, with reference to the drawings. This invention is not limited to the embodiment described below.

Moreover, the gas ejection system described below in this embodiment is an example of the system that is installed on a vehicle and that ejects compressed gas to a lens of an on-vehicle camera that captures images of surroundings of the vehicle to remove a rain drop, a snowflake, dust, dirt, mud, and the like on the lens.

However, the gas ejection system of this embodiment is not only for being installed on a vehicle. In a case where the gas ejection system of this embodiment is installed on a vehicle, a target to which the compressed gas is ejected is not limited to the lens of the on-vehicle camera. The compressed gas may be ejected, for example, toward a front windshield, a rear windshield, a headlight, a side mirror, etc. Moreover, the compressed gas may be ejected toward an optical sensor, such as a radar apparatus that detects an object in the surroundings of the vehicle.

A configuration outline of a gas ejection system 1 of this embodiment will be described below with reference to FIGS. 1A to 1C. Then, more specific configuration of the gas ejection system 1 of this embodiment will be described with reference to FIG. 2A and the subsequent figures.

Figure 1A:
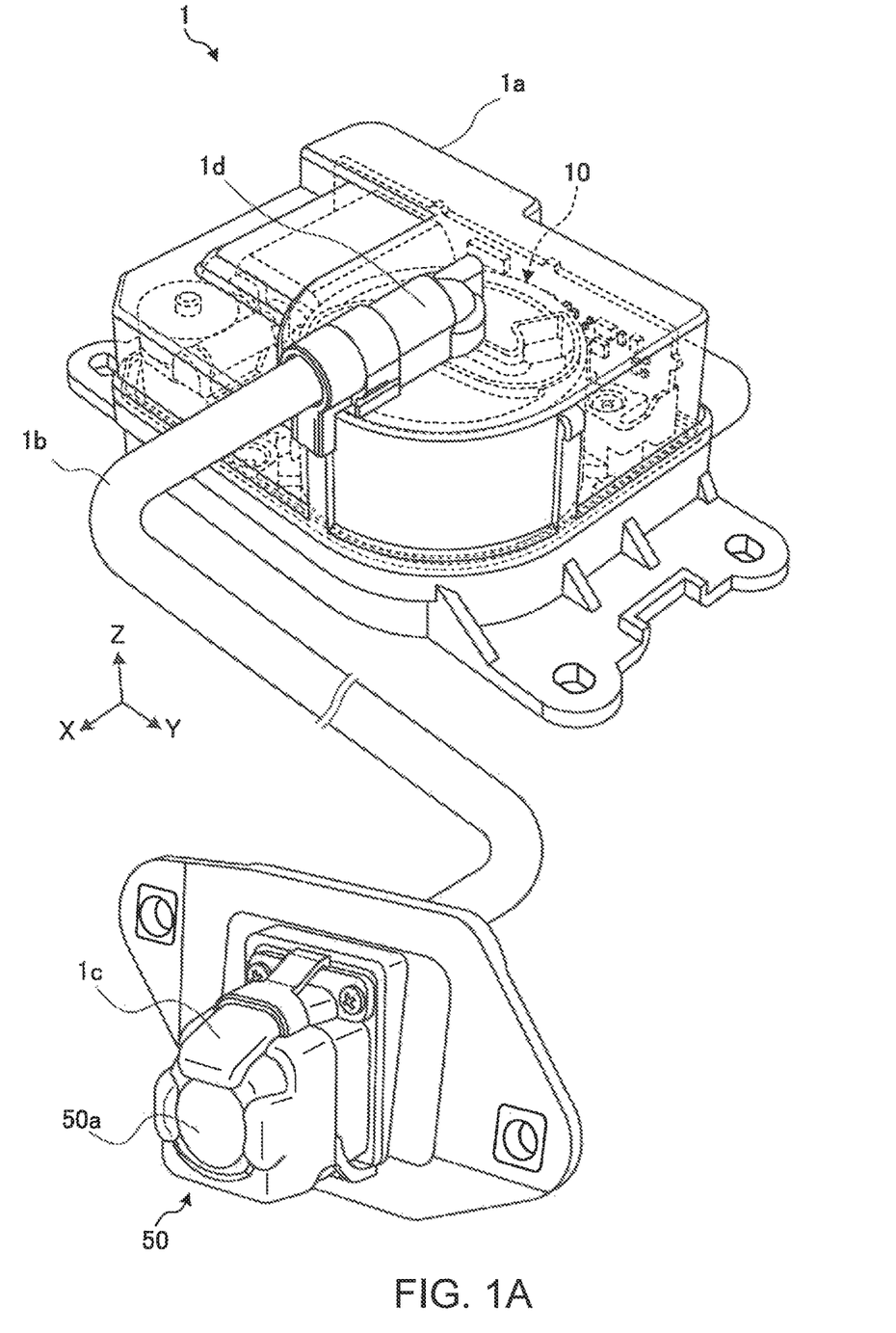
FIG. 1A is a perspective view illustrating a gas ejection system of this embodiment.
Figure 1B:
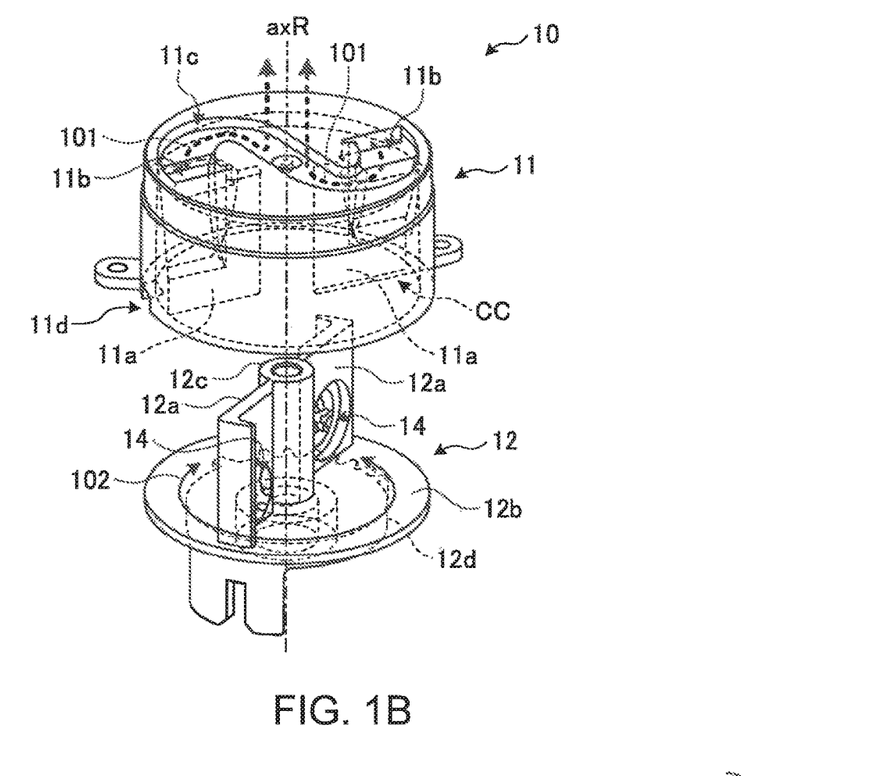
FIG. 1B is a perspective view illustrating a gas compressor.

FIG. 1A is a perspective view illustrating the gas ejection system 1 of this embodiment. FIG. 1B is a perspective view illustrating a configuration of a gas compressor 10, and FIG. 1C illustrates a motion of the gas compressor 10.

As shown in FIG. 1A, the gas ejection system 1 includes a gas ejection apparatus 1a, a hose 1b, an ejection nozzle 1c, and a camera 50. The gas ejection apparatus 1a includes: a case 6 that is installed on a vehicle; the gas compressor 10 that is disposed inside the case 6; and a cover 7 that covers the case 6, and sends out the gas compressed by the gas compressor 10. FIG. 1A includes a Cartesian coordinate including an X-axis, a Y-axis, and a Z-axis that are orthogonal to one another. The Cartesian coordinate will be shown in other figures for explanation below.

One end of the hose 1b is connected to an output tube 1d for the compressed gas of the gas ejection apparatus 1a, and the other end of the hose 1b is connected to the ejection nozzle 1c. The ejection nozzle 1c is installed on the camera 50 such that a gas jet orifice of the ejection nozzle 1c is directed toward lens 50a of the camera 50 that captures images of the surroundings of the vehicle.

The ejection nozzle 1c removes an object, such as a rain drop, on the lens 50a of the camera 50 by ejecting, from the jet orifice, the compressed gas sent out from the gas ejection apparatus 1a via the hose 1b. Thus, the gas ejection system 1 aids a field of view of a driver of the vehicle, and secures accurate sensing of an approaching object.

In a case where the ejection nozzle 1c is installed outside, if there is a rain drop around the gas jet orifice of the ejection nozzle 1c, the rain drop may be drawn up into an inside of the ejection nozzle 1c from the jet orifice due to capillarity action. In a state in which the drawn rain drop is in the inside of the ejection nozzle 1c, if the gas ejection apparatus 1a ejects the gas to the lens 50a of the camera 50, the gas ejection apparatus 1a causes water drops to be on the lens 50a of the camera 50.

Thus, a surface around the jet orifice and a gas flow surface inside the ejection nozzle 1c are water-repellent. Therefore, even if there is a water drop around the jet orifice, it is possible to prevent the water drop from entering the inside of the ejection nozzle 1c from the jet orifice.

The gas compressor 10 is a rotary gas compression mechanism. More specifically, the gas compressor 10 includes a cylinder 11 and a rotating member 12, as shown in FIG. 1B. The cylinder 11 includes cylinder walls 11a, sending outlets 11b, flow paths 11c, and gas inlets 11d. In a case where the gas ejection system 1 is installed on a vehicle, the gas ejection system 1 needs to be compact, lightweight and low cost. Therefore, it is recommended that the cylinder 11 and the rotating member 12 should be made from a resin or the like.

The cylinder 11 is formed in a cylindrical shape, for example, and has a cylinder chamber CC inside. The cylinder walls 11a are, for example, flat-plate shaped, and are provided so as to be point symmetric with respect to a rotation axis axR to divide the cylinder chamber CC substantially along a diameter of the cylinder chamber CC that is in a cylindrical shape. Thus, the cylinder chamber CC is divided into two sections (hereinafter, referred also to as "divided cylinder chambers CC) by the cylinder walls 11a.

The sending outlets 11b are examples of vents. The sending outlets 11b are apertures disposed to a ceiling of the cylinder chamber CC near the two cylinder walls 11a in a point symmetric position with respect to the rotation axis axR, such that each of the two divided cylinder chambers CC is connected to an outside of the cylinder 11 via each of the sending outlets 11b. The compressed gas generated by a rotary motion of the rotating member 12, described later, is ejected, via the sending outlets 11b, from the two divided cylinder chambers CC.

The flow paths 11e are connected to the sending outlets 11b. The flow paths 11e are formed in a point-symmetric shape with respect to the rotation axis axR. Moreover, the flow paths 11c are connected to the output tube 1d above the rotation axis axR. In other words, each of the flow paths 11c interconnects the sending outlet 11b of each of the plurality of the divided cylinder chambers CC with the output tube 1d located at an axial center of the cylinder 11. The compressed gas sent from the divided cylinder chambers CC via the sending outlets 11b is led to the output tube 1d through the flow paths 111c (see an arrow 101 in FIG. 1B), and then is ejected to the lens 50a of the camera 50 from the jet orifice of the ejection nozzle 1c through the hose 1b.

The gas inlets 11d are apertures disposed on an outer wall of the cylinder 11 and below the two sending outlets 11b to connect the cylinder chamber CC with the outside of the cylinder 11. Gas taken in by the rotary motion of the rotating member 12, described later, is led to the cylinder Chamber CC via the gas inlets 11d.

The rotating member 12 includes blades 12a, a rotation base 12b, and a shaft 12c. The rotation base 12b is formed in a circular flat plate shape, and is rotatably provided around the rotation axis axR (see an arrow 102 in FIG. 1B).

More specifically, the rotation base 12b includes a driven gear 12d on a surface of the rotation base 12b that is opposite to a surface on which the cylinder 11 is disposed. The driven gear 12d receives a driving force of a motor, for example, by being engaged with a drive gear that is connected to the motor so that the rotation base 12b rotates around the rotation axis axR in a predetermined direction.

Moreover, in a free state in which the rotation base 12b is free from the driving force of the motor, the rotation base 12b is biased by a spring in a direction opposite to the predetermined direction of rotation caused by the motor. Each of the blades 12a is formed in a plate shape, and is disposed so as to stand to divide the rotation base 12b along a diameter thereof on the surface opposite to the surface on which the driven gear 12d is disposed. Moreover, each blade 12a has a gas intake valve 14 on a wall.

The shaft 12c is a shaft for rotation around the rotation axis axR. The shaft 12c is provided between the two blades 12a, and connects the two blades 12a. The rotation base 12b of the rotating member 12, configured as described above, is rotatably engaged with the cylinder 11, and rotates inside the cylinder chamber CC. Thus, a cycle of steps including intake and ejection of the gas is performed, and the compressed gas is generated.

Figure 1C:
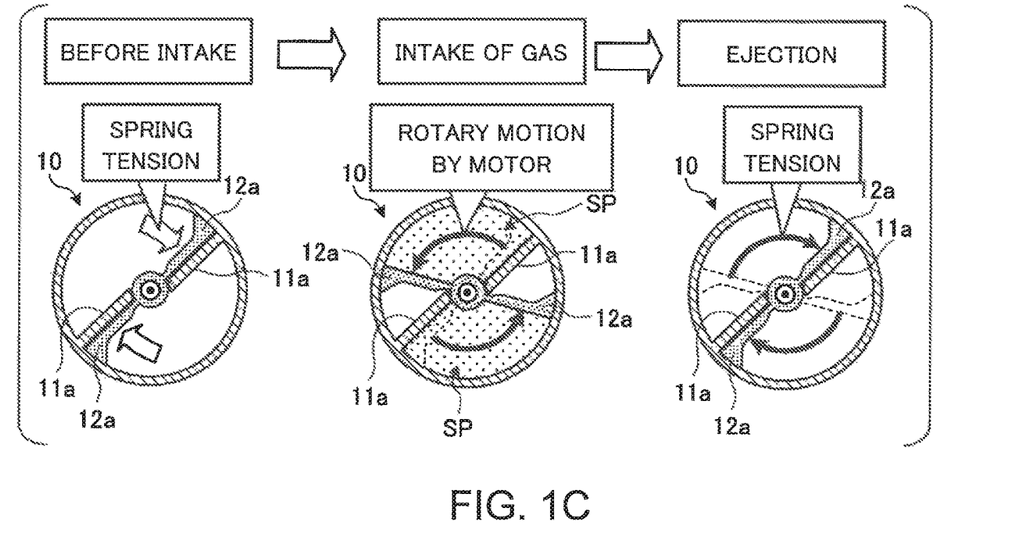
FIG. 1C illustrates a motion of the gas compressor.

More specifically, as shown in FIG. 1C, in a state "before intake of gas," the rotating member 12 of the gas compressor 10 is free from the driving force of the motor, as described above, and the blades 12a are pushed onto the cylinder walls 11a because the blades 12a are biased by "spring tension" of the springs.

Then, when each of the blades 12a rotates by the "driving force of the motor" in a direction in which the blades 12a move away from the cylinder wall 11a, a space SP between the blade 12a and the cylinder wall 11a is expanded, and a negative pressure is generated in the space SP, and then the gas is "taken in."

Once the blade 12a reaches a predetermined position, the driving force of the motor is released. Then, the blade 12a becomes free from the driving force of the motor, and swiftly moves back to a state in which the blades 12a abut on the cylinder walls 11a due to the "spring tension" of the springs. At that time, the space SP is compressed, i.e., compressed gas is generated from the gas "taken" in the space SP, and the compressed gas is "ejected" from the sending outlets 11b at a high pressure.

Figure 2A:
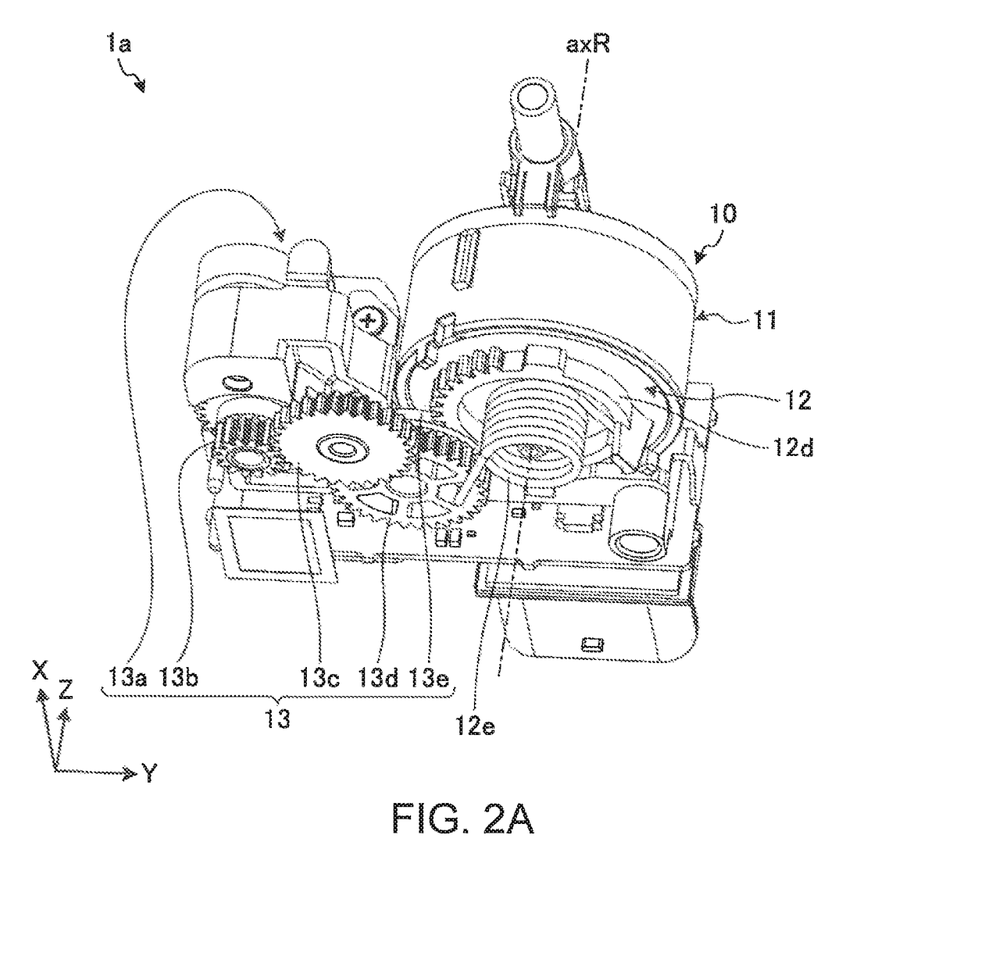
FIG. 2A is a perspective view illustrating an internal configuration of a gas ejection apparatus.

A more detailed configuration of the gas ejection apparatus 1a of this embodiment including the rotary mechanism will be described below with reference to FIG. 2A and the subsequent drawings. FIG. 2A is a perspective view illustrating an internal configuration of the gas ejection apparatus 1a.

As described above, as shown in FIG. 2A, the gas ejection apparatus 1a includes the gas compressor 10, and the gas compressor 10 includes the cylinder 11 and the rotating member 12. The rotating member 12 includes the driven gear 12d. The driven gear 12d is provided coaxially with the rotation axis axR. As described above, the gas compressor 10 is a rotary mechanism so that a configuration of the gas compressor 10 can be space-saving and more compact as compared to a piston type.

Moreover, the rotating member 12 includes biasing springs 12e corresponding to the "springs" mentioned above. The biasing springs 12e are disposed so as to bias the rotating member 12 in the direction opposite to the predetermined direction in which the rotating member 12 is rotated by the motor. Moreover, the gas compressor 10 further includes a drive part 13. The drive part 13 includes a motor 13a, a first gear 13b, a second gear 13c, a third gear 13d, and a preceding gear 13e.

The motor 13a is an example of rotary driving sources, and is, for example, an electric motor. The motor 13a may be a hydraulic motor or the like. The motor 13a of this embodiment rotates in one direction, in principle. Moreover, for example, a worm, not illustrated, is formed on an output shaft of the motor 13a, and the output shaft of the motor 13a meshes with the first gear 13b via the worm.

The first gear 13b meshes with the second gear 13c. The second gear 13c meshes with the third gear 13d. The preceding gear 13e is disposed coaxially with the third gear 13d so as to engage with the driven gear 12d of the rotating member 12.

The rotary driving force of the motor 13a is transmitted to the preceding gear 13e via the first gear 13b, the second gear 13e, and the third gear 13d meshing with one another, as described above. A number of the gears and mesh of those gears from the motor 13a to the preceding gear 13e are not limited to an example shown in the figures.

Figure 2B:
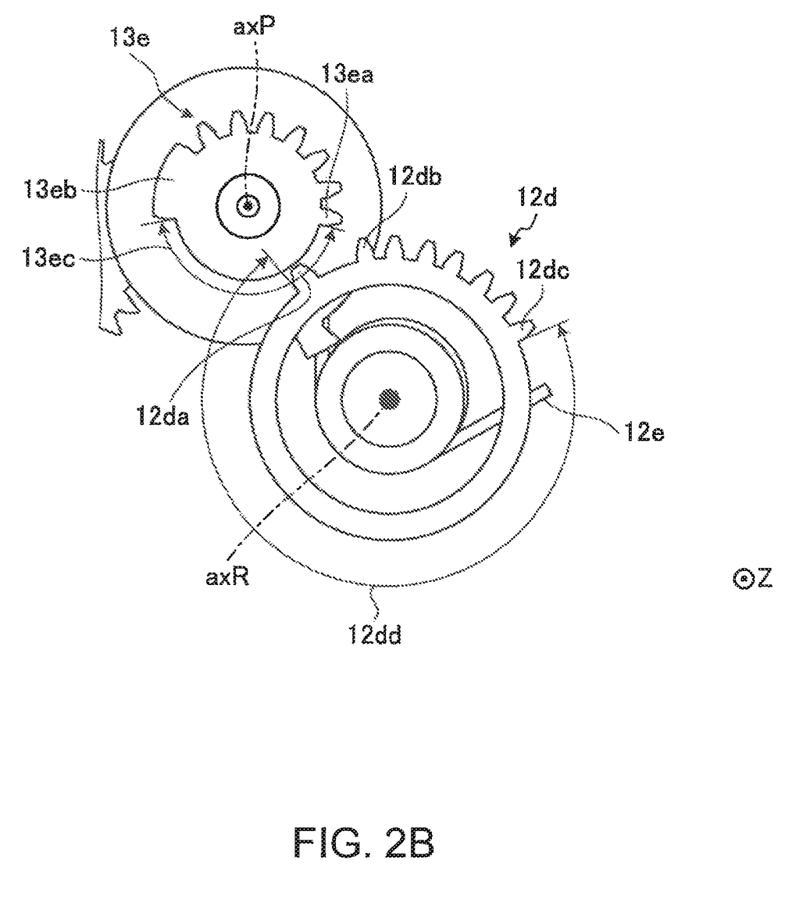
FIG. 2B is a schematic plan diagram illustrating a configuration of a driven gear and a preceding gear.

Next, FIG. 2B is a schematic plan diagram illustrating a configuration of the driven gear 12d and the preceding gear 13e. FIG. 2B is the schematic diagram illustrating only the driven gear 12d and the preceding gear 13e viewed from a positive Z-axis direction.

As shown in FIG. 2B, the driven gear 12d is a partially-toothless gear, i.e., a gear of which some of continuous teeth are cut out. The driven gear 12d includes at least a first tooth 12da, a second tooth 12db, a last tooth 12dc, and a toothless portion 12dd.

The first tooth 12da is a tooth that is first engaged with the preceding gear 13e in one cycle of intake and ejection of gas, and the last tooth 12dc is a tooth that is last engaged with the preceding gear 13e. In the description below, when being viewed from the positive Z-axis direction, the driven gear 12d rotates counterclockwise around the rotation axis axR by the rotary driving force of the motor 13a transmitted from the preceding gear 13e. Accordingly, the biasing springs 12e bias the driven gears 12d clockwise.

The preceding gear 13e is also formed as a partially-toothless gear, i.e., a gear of which some of continuous teeth are cut out. The preceding gear 13e includes, at least a first tooth 13ea, a last tooth 13eb, and a toothless portion 13ec.

The first tooth 13ea is a teeth that is first engaged with the driven gear 12d in the one cycle of intake and ejection of gas, and the last tooth 13eb is a teeth that is last engaged With the driven gear 12d. In the description below, when being viewed from the positive Z-axis direction, the preceding gear 13e rotates clockwise around the rotation axis axR by the rotary driving force of the motor 13a.

Figure 3:
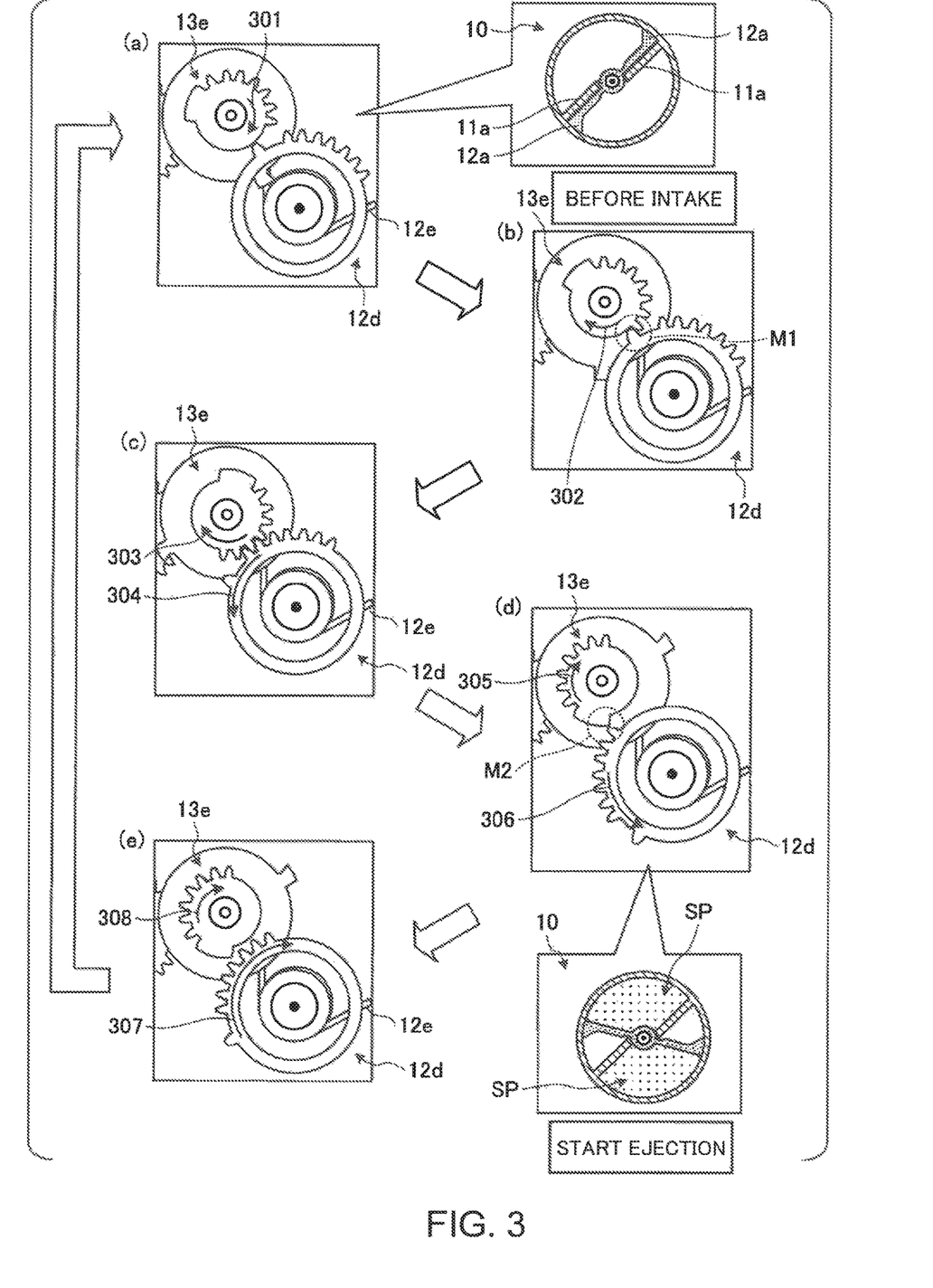
FIG. 3 illustrates a more detailed motion of the gas compressor.

Next, a motion of the gas compressor 10 by engagement of the driven gear 12d with the preceding gear 13e will be described in more detail, with reference to FIG. 3. FIG. 3 illustrates the motion of the gas compressor 10 in more detail.

Since the driven gear 12d and the preceding gear 13e are formed as the partially-toothless gears, as described above, there is a state in which the driven gear 12d and the preceding gear 13e are not engaged with each other due to the toothless portions. The gas ejection system 1 of this embodiment makes use of the state in which the driven gear 12d and the preceding gear 13e are not engaged with each other.

As shown in FIG. 3(a), although the motor 13a is activated and the preceding gear 13e rotates in a direction shown by an arrow 301 in FIG. 3(a), the preceding gear 13e is not engaged with the driven gear 12d yet. Such a state, as shown in FIG. 3, is the state "before intake of gas" by the gas compressor 10.

In the state "before intake of gas," the blades 12a of the gas compressor 10 are pushed onto the cylinder walls 11a by the "spring tension" of the biasing spring 12c.

Then, when the preceding gear 13e rotates further in a same direction, as shown in FIG. 3(b), from such a state (see an arrow 302 in FIG. 3(b)), the driven gear 12d and the preceding gear 13e start to engage with each other (see a portion M1 in FIG. 3(b)). This is a state in which the gas compressor 10 starts to take the gas in:

Then, as shown in FIG. 3(c), further rotation of the preceding gear 13e in the same direction (see an arrow 303 in FIG. 3 (c)) causes the engaged driven gear 12d to rotate counterclockwise (see an arrow 304 in FIG. 3(c)) against a biasing power of the biasing spring 12e. In such a state, the gas compressor 10 is taking the gas in.

In other words, when the driven gear 12d is engaged with the preceding gear 13e, the driven gear 12d is caused to rotate counterclockwise because a power to rotate the driven gear 12d in the predetermined direction (counterclockwise) caused by the motion of the motor 13a connected to the preceding gear 13e is greater than a power to rotate the driven gear 12d in the opposite direction (clockwise) caused by the biasing power of the biasing spring 12e.

In other words, the power to rotate the driven gear 12d in the direction opposite (clockwise) to the predetermined direction caused by the biasing power of the biasing spring 12e is smaller than the power to rotate the driven gear 12d in the predetermined direction (counterclockwise) caused by the motion of the motor 13a.

However, when the driven gear 12d is not engaged with the preceding gear 13e, i.e., when the driven gear 12d gets disengaged with the preceding gear 13e due to the toothless portion, as described above, so that the driven gear 12d falls into the free state, the driven gear 12d rotates in the opposite direction (clockwise) because only the biasing power of the biasing spring 12e acts on the driven gear 12d.

In other words, the biasing power of the biasing spring 12e to rotate the driven gear 12d in the opposite direction (clockwise) is smaller than the power of the motor 13a to rotate the driven gear 12d in the predetermined direction (counterclockwise).

More specifically, as shown in FIG. 3(d), due to further rotations (see arrows 305 and 306 in FIG. 3(d)) of the preceding gear 13e and the driven gear 12d from a state shown in FIG. 3(c), a time point comes at which the driven gear 12d gets disengaged from the preceding gear 13e (see a M2 portion in FIG. 3(d)). As show t FIG. 3, the time point corresponds to "start of gas ejection" of the gas compressor 10.

Then, as shown FIG. 3(e), when being disengaged from the preceding gear 13e, the driven gear 12d springs back clockwise due to the spring tension of the biasing spring 12e (see an arrow 307 in FIG. 3(e)), and the taken gas is ejected to the space SP While being compressed. Moreover, the preceding gear 13e rotates in the same direction (see an arrow 308 in FIG. 3(e)), and the cycle starting from (a) shown in FIG. 3 is repeated for a next one cycle of intake and ejection of gas.

As described above, in this embodiment, the time point at which the preceding gear 13e gets disengaged from the driven gear 12d is caused by the toothless portions of the gears 13e and 12d. At the time point, the driven gear 12d springs back clockwise by the biasing spring 12e. Thus, the motor 13a only rotates in one same direction. Therefore, the gas can be compressed in such a simple configuration.

Moreover, in this embodiment, since the gas compressor 10 is provided as the rotary gas compression mechanism, the gas compressor 10 can be compact as compared to, for example, a piston gas compression mechanism in which a piston moves back and forth within a cylinder. In other words, according to this embodiment, the gas can be compressed in the simple and compact configuration.

For example, in a case Where the gas ejection system 1 is installed on a vehicle, as a dealer option, a space for the gas ejection system 1 is not prepared in advance. Therefore, it is recommended that the gas ejection apparatus 1a should be small as much as possible.

In this embodiment, the gas ejection apparatus 1a is downsized by improving an arrangement of constituent elements of the gas ejection apparatus 1a that is stored in the case 6 and the cover 7. Next described will be the arrangement of the constituent elements of the gas ejection apparatus 1a, with reference to FIG. 4.

Figure 4:
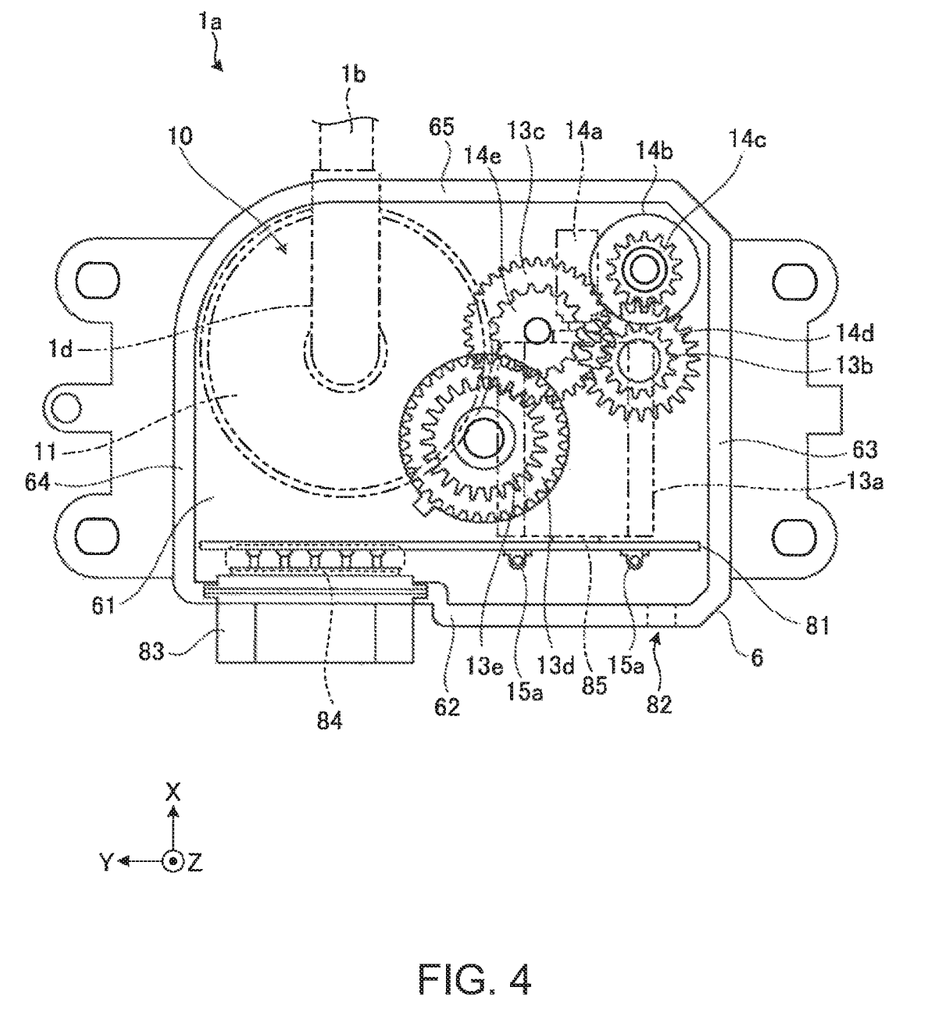
FIG. 4 illustrates an arrangement of constituent elements of the gas ejection apparatus of this embodiment.

FIG. 4 illustrates the arrangement of the constituent elements of the gas ejection apparatus 1a of this embodiment. In FIG. 4, the cover 7 is not illustrated, and the cylinder 11, the output tube 1d, the hose 1b, the motor 13a and a worm gear 14a, described later, are shown by two-dot chain lines.

As shown in FIG. 4, main constituent elements stored inside the case 6 are the cylinder 11, the motor 13a, a control circuit board 81, and a plurality of gears. The control circuit board 81 controls the motor 13a to compress the gas. For example, the worm gear 14a, a first drive gear 14b, a second drive gear 14c, a first connection gear 14d, the first gear 13b, the second gear 13c, a second connection gear 14e, the third gear 13d, and the preceding gear 13e are among the plurality of gears.

In FIG. 4, the worth gear 14a is shown in a rectangle shape by a two-dot chain line in a plan view. Moreover, in FIG. 4, the first drive gear 14b is shown by a solid line in a circular shape of which a diameter is greater than a diameter of the second drive gear 14c that is concentric with the first drive gear 14b.

Among the foregoing constituent elements, the cylinder 11 accounts for a greatest space inside the case 6 because the cylinder 11 needs a space to generate an enough amount of the compressed gas. Moreover, a shape of the cylinder 11 is substantially cylindrical and cannot be changed due to a structure of the gas ejection system 1 including the gas compressor 10 that compresses the gas.

The plurality of gears account for a second greatest space inside the case 6 after the cylinder 11. However, the plurality of gears can be arranged freely to some degree because any arrangement is acceptable only if the gears transmit the force of the motor 13a to the driven gear 12d of the rotating member 12 (see FIG. 2A).

On the other hand, the motor 13a that accounts for a third greatest space inside the case 6 after the plurality of gears is in a fixed shape. Thus, a degree of flexibility in arranging the motor 13a is relatively small. Moreover, the motor 13a needs to be supplied with power from the control circuit board 81.

The control circuit board 81 needs a space for a principal surface thereof. However, a thickness of the control circuit board 81 is very small as compared to other constituent elements. An input terminal for electricity, an input terminal for control signals that is inputted from an external control apparatus (not illustrated) to perform a drive control of the motor 13a, and the like are disposed to the control circuit board 81. Therefore, it is recommended that these input terminals should be disposed adjacent to a side surface of the case 6.

In the view of the foregoing characteristics of the constituent elements of the gas ejection apparatus 1a, the arrangement of the constituent elements is improved in this embodiment to downsize the gas ejection apparatus 1a as much as possible.

In this embodiment, the motor 13a and the cylinder 11 are adjacent to each other in a planar direction of the case 6, and the control circuit board 81 is disposed adjacent to and substantially parallel to one of the side surfaces of the case 6. More specifically, as shown in FIG. 4, the case 6 extends in the planar direction and includes: an installation surface 61 that is substantially rectangle in the plan view; a first side wall 62, a second side wall 63, a third side wall 64, and a fourth side wall 65 that are orthogonal to the planar direction and that stand on a rim of the installation surface 61 to surround the installation surface 61.

The control circuit hoard 81 is disposed adjacent to the first side wall 62 on the installation surface 61 such that the principal surface of the control circuit board 81 is orthogonal to the installation surface 61. Thus, a space surrounded by the control circuit board 81, the second side wall 63, the third side wall 64, and the fourth side wall 65, i.e. an almost region of the installation surface 61 can be efficiently used as an arrangement area for the constituent elements other than the control circuit board 81 in this embodiment.

The motor 13a is disposed directly on the control circuit board 81 and adjacent to the second side wall 63 that is disposed next to the first side wall 62. The control circuit board. 81 is disposed adjacent to the first side wall 62. More specifically, a terminal 15a of the motor 13a is inserted and soldered to the control circuit board 81, in a posture in which a rotation axis of the motor 13a is in a normal direction of the principal surface of the control circuit board 81.

Thus, for example, as compared to a case in which the motor 13a is disposed in a posture other than the posture shown in FIG. 4 and the motor 13a is connected to the control circuit board 81 by a wire, the arrangement of this embodiment does not need a space for wiring so that the gas ejection apparatus 1a can be downsized.

Moreover, the motor 13a in the fixed shape is arranged adjacent to the first side wall 62, and the second side wall 63. Thus, a relatively large space surrounded by the control circuit board 81, the motor 13a, the third side wall 64, and the fourth side wall 65 can be efficiently used as the arrangement area for other constituent elements, in this embodiment. Therefore, the cylinder 11 is disposed in the relatively large space formed by being surrounded by the control circuit board 81, the motor 13a, the third side wall 64, and the fourth side wall 65.

As described above, in this embodiment, the control circuit board 81 is disposed adjacent to the first side wall 62. The cylinder 11 and the motor 13a in the fixed shapes are arranged adjacent to each other in the planar direction in the empty space. Therefore, the gas ejection apparatus 1a is downsized further.

A spring washer 85 is placed between a housing of the motor 13a and the control circuit board 81. A function of the spring washer 85 will be described later with reference to FIGS. 5A and 5B.

Moreover, among the plurality of gears, gears other than the worm gear 14a and the first drive gear 14b are disposed between the motor 13a and the installation surface 61 (see FIG. 2A). Here, an arrangement and motions of the plurality of gears will be described more in detail.

The worm gear 14a is provided to the rotation axis of the motor 13a, The first drive gear 14b and the second drive gear 14c are disposed to a negative side in a Y-axis direction in the plan view, as compared to the worm gear 14a. The first drive gear 14b is disposed so as to be in a same position in a Z-axis direction (height) as a position of the worm gear 14a. Thus, the first drive gear 14b meshes with the worm gear 14a.

On the other hand, the second drive gear 14c is disposed to a lower position in the Z-axis direction than the position of the first drive gear 14b. In other words, the second drive gear 14c is disposed to a position adjacent to the installation surface 61 more than the first drive gear 14b. The second drive gear 14c coaxially rotates with the first drive gear 14b.

The first connection gear 14d and the first gear 13b are disposed to a negative side in the X-axis direction in the plan view as compared to the second drive gear 14c, between the motor 13a and the installation surface 61. The first connection gear 14d meshes with the second drive gear 14c, and rotates in conjunction with a rotary motion of the second drive gear 14c. The first gear 13b coaxially rotates with the first connection gear 14d.

The second gear 13c and the second connection gear 14e are disposed to a positive side in the Y-axis direction in the plan view as compared to the first gear 13b, between the motor 13a and the installation surface 61. The second gear 13c meshes with the first gear 13b, and rotates in conjunction with a rotary motion of the first gear 13b. The second connection gear 14e coaxially rotates with the second gear 13c.

The third gear 13d and the preceding gear 13e are disposed to the negative side in the X-axis direction as compared to the second connection gear 14e, between the motor 13a and the installation surface 61. The third gear 13d meshes with the second connection gear 14e, and rotates in conjunction with a rotary motion of the second connection gear 14e. The preceding gear 13e coaxially rotates with the third gear 13d. The preceding gear 13e rotates the driven gear 12d (see FIG. 2A) disposed on a bottom surface of the rotating member 12.

As described above, among the plurality of gears, the most of the gears other than the worm gear 14a and the first drive gear 14b are disposed between the motor 13a and the installation surface 61 in this embodiment. More specifically, the second drive gear 14c, the first connection gear 14d, the first gear 13b, the second gear 13c, the second connection gear 14e, the third gear 13d, the preceding gear 13e, and the motor 13a are arranged to be layered over one another in the Z-axis direction.

Thus, since a space under the motor 13a is efficiently used by arranging the plurality of gears in the space in this embodiment, the gas ejection apparatus 1a can be downsized.

Moreover, in this embodiment, the gears are arranged such that after being transmitted in the negative Y-axis direction, the driving force of the motor. 13a is transmitted in the negative Z-axis direction, and then is transmitted in the positive Y-axis direction under the motor 13a.

Thus, the gas ejection apparatus 1a is further downsized by shortening a distance in the Y-axis direction in which the plurality of gears are arranged, as compared to, for example, a case in which the gears are arranged such that the driving force of the motor 13a is linearly transmitted in the positive Y-axis direction.

Moreover, the gas ejection apparatus 1 a includes a gas inlet 82 for taking in the gas from an outside of the case 6 to an inside thereof. The gas inlet 82 is provided to the case 6 on a side adjacent to the motor 13a arranged substantially in parallel to the cylinder 11. More specifically, in order to take in the gas from the outside of the case 6 to the inside thereof, the case 6 includes the gas inlet 82 that is disposed in a position facing the motor 13a on the first side wall 62 near that is adjacent to the control circuit board 81. Thus, the gas ejection apparatus 1a cools the motor 13a by the gas taken in from the outside of the case 6 to the inside.

A water-repellent mesh sheet that covers the gas inlet 82 is provided to the gas inlet 82. Thus, the gas ejection apparatus 1a prevents a water drop from entering the inside of the case 6 from the gas inlet 82.

The gas ejection apparatus 1a is installed to the vehicle in a posture in which the gas inlet 82 is located on a vertically lower end. In other words, the gas inlet 82 is disposed so as to be located on a lower end of the case 6 when the gas ejection apparatus 1a is installed. Thus, the gas ejection apparatus 1a more surely prevents a water drop from entering the inside of the case 6 from the gas inlet 82.

The gas ejection apparatus 1a further includes a connector 83 on a side surface of the case 6 near that is adjacent to the control circuit board 81. More specifically, the gas ejection apparatus 1a includes the connector 83 on an outer surface of the first side wall 62 near that is adjacent to the control circuit board 81. The connector 83 faces the cylinder 11 across the control circuit board 81. Water-repellent finish is applied to the connector 83, and a water-repellent connector, not illustrated, is inserted to the connector 83.

The gas ejection apparatus 1a includes a plurality of connection terminals 84 that are extended from a surface on a side of the control circuit board 81 to be connected to the connector 83. The surface on the side of the control circuit board 81 faces the connector 83. Some among the plurality of connection terminals 84 are: the input terminal for the control signals inputted to perform the drive control of the motor 13a from, for example, the external control apparatus (not illustrated); the input terminal for electricity; and a ground terminal.

As described above, since the control circuit board 81 is disposed adjacent to the first side wall 62 in this embodiment, the plurality of connection terminals 84 can be extended directly to an inside of the connector 83 from the control circuit board 81 without wiring from the control circuit board 81. Thus, the gas ejection apparatus 1a needs no wiring to connect the control circuit board 81 with the plurality of connection terminals 84 so that the gas ejection apparatus 1a is downsized.

Moreover, since the water-repellent finish is applied to the connector 83, and the water-repellent connector, not illustrated, is inserted into the connector 83, there is a low possibility that a water drop enters the inside of the gas ejection apparatus 1a. However, when the gas ejection apparatus 1a, is installed on the vehicle, the connector 83 is located on the vertically lower end, as with the gas inlet 82. Thus, the gas ejection apparatus 1a more surely prevents a water drop from entering the gas ejection system 1.

Further, in this embodiment, the output tube 1d that outputs the compressed gas to be sent out from the cylinder 11 is provided such that a longer side of the output tube 1d is substantially parallel to the installation surface 61 (in the positive X-axis direction in FIG. 4).

Thus, thickness (a dimension in the positive Z-axis direction) of the gas ejection apparatus 1a is smaller than a case, for example, in which the longer side of the gas ejection apparatus 1a is disposed in the positive Z-axis direction. Thus, a thickness dimension of the gas ejection system 1 is reduced.

Figure 5A:
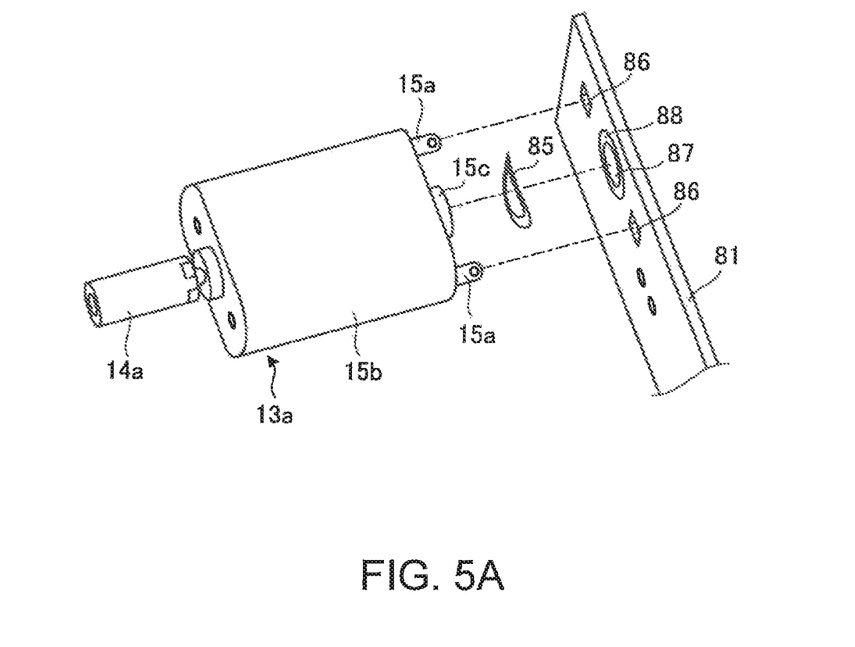
FIG. 5A illustrates an installation method of a spring washer of this embodiment.
Figure 5B:
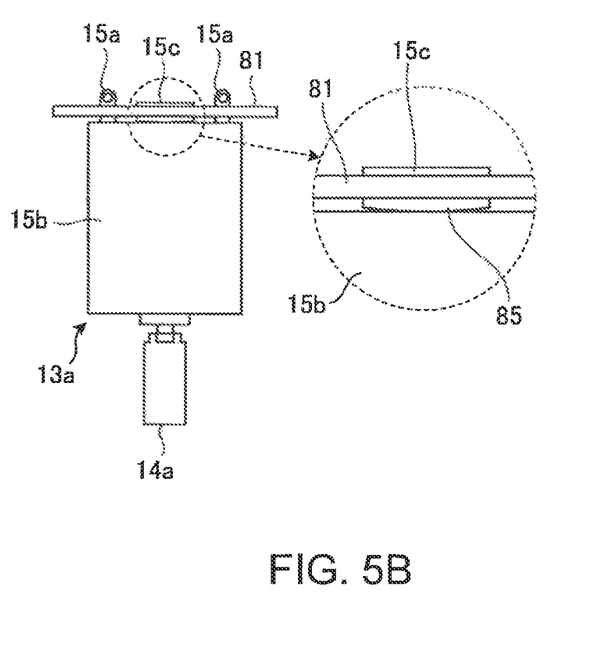
FIG. 5B illustrates a state of the spring washer of this embodiment installed.

Next described will be the function of the spring washer 85 that is placed between a housing 15b of the motor 13a and the control circuit board 81, with reference to FIGS. 5A and 5B. The spring washer 85 is an example of conductive members that contacts the motor 13a, and is electrically connected to a ground of the control circuit board 81.

FIG. 5A illustrates an installation method of the spring washer 85 of this embodiment. FIG. 5B illustrates a state of the spring washer 85 installed of this embodiment. A left drawing of FIG. 5B illustrates an entire motor after the spring washer 85 is installed. A right drawing of FIG. 5B is an enlarged drawing of the spring washer 85 installed and a near area thereof.

As shown in FIG. 5A, the motor 13*a* includes the conductive housing 15*b* that houses a rotor and an armature winding wire inside. A rotation axis of the motor 13*a* extends from one end surface of the housing 15*b*, and the worm gear 14*a* is provided to the rotation axis. Moreover, the terminal 15*a* of the motor 13*a* and a boss 15*c* are projected from another end surface of the housing 15*b*.

In the motor 13*a*, when electricity is provided to the armature winding wire to rotate the rotor, noise is emitted from an inside of the housing 15*b*. The noise has an adverse effect on drive control for the motor 13*a*.

This embodiment reduces an amount of the emitted noise by placing the spring washer 85 that is conductive, between the housing 15*b* of the motor 13*a* and the control circuit board 81. More specifically, a terminal aperture 86 and a boss aperture 87 are disposed to the control circuit board 81. The terminal of the motor 13*a* that is directly soldered to the control circuit board 81, is inserted to the terminal aperture 86. The boss 15*c* of the motor 13*a* is inserted to the boss aperture 87.

Moreover, a ground pattern 88 is provided in a ring form to the control circuit board 81 to encircle the boss aperture 87. The ground pattern 88 is formed, using a copper foil, to be connected to a ground via a wiring pattern on the control circuit board 81 and a ground terminal among the plurality of connection terminals 84.

In a step in which the motor 13*a* is mounted on the control circuit board 81, a position of the terminal 15*a* of the motor 13*a* is matched to the terminal aperture 86, and a position of the boss 15*c* is matched to an aperture of the spring washer 85 and the boss aperture 87.

After the boss 15*c* is inserted into the aperture of the spring washer 85, the boss 15*e* is inserted into the boss aperture 87, and the terminal 15*a* of the motor 13*a* is simultaneously inserted into the terminal aperture 86. The terminal 15*a* is soldered on the control circuit board 81 while the motor 13*a* is pressed against the control circuit board 81.

Thus, as shown in the left drawing of FIG. 5B, the conductive spring washer 85 is placed between the housing 15*b* of the motor 13*a* and the control circuit board 81, and the housing 15*b* is connected to the ground.

Therefore, since the noise emitted from the inside of the housing 15*b* is released to the ground via the housing 15*b*, the spring washer 85, the ground pattern 88, a wire on the control circuit board 81 and the ground terminal, the amount of the emitted noise is reduced.

Moreover, in this embodiment, instead of a flat washer, the spring washer 85 that is a 3D spring washer formed by bending a flat washer, is placed between the housing 15*b* of the motor 13*a* and the control circuit board 81.

Thus, as shown in the right drawing of FIG. 5B, even if there is a small gap between the motor 13*a* directly soldered on the control circuit board 81 and the control circuit board 81, the bent spring washer 85 surely connects the housing 15*b* to the ground pattern 88.

In this embodiment, the spring washer 85 formed by bending a flat washer is used. However, a spiral washer or a conductive gasket may be used instead of the spring washer 85.

While the invention has been shown and described in detail, the foregoing description is in all aspects illustrative and not restrictive. It is therefore understood that numerous other modifications and variations can be devised without departing from the scope of the invention.

What is claimed is:

1. A gas ejection apparatus comprising:
   a cylinder having an axis;
   a rotating member that rotates within the cylinder to cause gas to be compressed inside the cylinder and to be ejected from the cylinder;
   a motor having a rotational axis and coupled to the rotating member to rotate the rotating member;
   a control circuit board that controls the motor and extends in a planar direction that is perpendicular to the axis of the cylinder and the rotational axis of the motor; and
   a case in which the cylinder, the motor and the control circuit board are disposed and having side surfaces, wherein:
   the motor and the cylinder are arranged side-by-side in the planar direction;
   the control circuit board is adjacent to and substantially parallel to one of the side surfaces of the case; and
   the control circuit board overlaps the motor and the cylinder in a direction orthogonal to the planar direction.

2. The gas ejection apparatus according to claim 1, further comprising
   a gas inlet that is provided in the side surfaces of the case adjacent to the motor, the gas inlet taking in the gas from an outside of the case to an inside of the case.

3. The gas ejection apparatus according to claim 2, wherein
   the gas inlet is provided on a lower end of a first of the side surfaces of the case adjacent to an installation surface of the case.

4. The gas ejection apparatus according to claim 1, further comprising
   a connector on the one of the side surfaces of the case.

5. The gas ejection apparatus according to claim 1, further comprising
   a conductive member that contacts the motor, wherein
   the conductive member is electrically connected to a ground of the control circuit board.

6. The gas ejection apparatus according to claim 5, wherein
   the conductive member is a spring washer.

7. The gas ejection apparatus according to claim 1, wherein
   a rotation axis of the rotating member is orthogonal to the rotational axis of the motor.

8. The gas ejection apparatus according to claim 7, wherein
   the rotation axis of the rotating member is orthogonal to the planar direction.

9. The gas ejection apparatus according to claim 7, wherein
   the rotation axis of the motor is parallel to the planar direction.

10. The gas ejection apparatus according to claim 1, further comprising
    a biasing member that biases the rotating member in a first rotary direction which is toward an exhaust state of the cylinder, wherein
    the motor applies a driving force in a second rotary direction that is opposite to the first rotary direction to cause the rotating member to be rotated toward an intake completion state.

11. The gas ejection apparatus according to claim 10, wherein
the biasing member is a spring.

12. The gas ejection apparatus according to claim 1, wherein the control circuit board is adjacent to the cylinder and the motor without another component being between the control circuit board and the cylinder or the motor.

* * * * *